United States Patent [19]

Papetti

[11] Patent Number: 5,167,976
[45] Date of Patent: Dec. 1, 1992

[54] METHOD OF PRODUCING EXTENDED REFRIGERATED SHELF LIFE BAKEABLE LIQUID EGG

[75] Inventor: Stephen T. Papetti, Hillside, N.J.

[73] Assignee: Papetti's Hygrade Egg Products Inc., Elizabeth, N.J.

[21] Appl. No.: 705,087

[22] Filed: May 24, 1991

[51] Int. Cl.$^5$ .................................................. A23B 5/05
[52] U.S. Cl. ................................. 426/330.1; 426/614
[58] Field of Search ............................ 426/330.1, 614

[56] References Cited

U.S. PATENT DOCUMENTS

| | | | |
|---|---|---|---|
| 2,760,866 | 8/1956 | Nielsen | 426/74 |
| 2,776,214 | 1/1957 | Lloyd | 426/330.1 |
| 3,113,872 | 12/1963 | Jones et al. | |
| 3,212,906 | 10/1965 | Jones | 426/614 |
| 3,251,697 | 5/1966 | Lineweaver | 426/614 |
| 3,404,008 | 10/1968 | Ballas | 426/614 |
| 3,471,302 | 10/1969 | Rogers | 426/614 |
| 3,484,243 | 12/1969 | Anderson et al. | 426/623 |
| 3,520,700 | 7/1970 | Kohl | 426/330.1 |
| 3,549,388 | 12/1970 | Kohl | 426/614 |
| 3,561,980 | 2/1971 | Sourby | 426/614 |
| 3,573,935 | 4/1971 | Sourby | 426/614 |
| 3,658,558 | 4/1972 | Rogers | 426/614 |
| 3,682,660 | 8/1972 | Kohl | 426/330.1 |
| 3,962,484 | 6/1976 | Grossu et al. | 426/74 |
| 4,055,667 | 10/1977 | Linton et al. | 426/807 |
| 4,089,979 | 5/1978 | Jackson | 426/807 |
| 4,442,215 | 4/1984 | Vognsen et al. | 71/11 |
| 4,808,425 | 2/1989 | Swartzel | 426/614 |
| 4,957,759 | 9/1990 | Swartzel | 426/614 |
| 4,957,760 | 9/1990 | Swartzel | 426/614 |
| 4,994,291 | 2/1991 | Swartzel | 426/614 |
| 5,019,407 | 5/1991 | Swartzel | 426/614 |
| 5,019,408 | 5/1991 | Swartzel | 426/614 |

FOREIGN PATENT DOCUMENTS 1217360 12/1968 United Kingdom.

OTHER PUBLICATIONS

Hawley "The Condensed Chemical Dictionary Van Nostrand Reinhold Co." 10th Edition (1982) pp. 179–180, 635 and 1110–1111.

*Primary Examiner*—Carolyn Paden
*Attorney, Agent, or Firm*—Lerner, David, Littenberg, Krumholz & Mentlik

[57] ABSTRACT

The present invention relates to methods and apparatus for the production of liquid egg having both extended refrigerated shelf life and retained baking functionality. The method involves first pasteurizing liquid egg and then subjecting the pasturized liquid egg to further treatment.

17 Claims, 3 Drawing Sheets

METHOD OF PRODUCING EXTENDED REFRIGERATED SHELF LIFE BAKEABLE LIQUID EGG

FIELD OF THE INVENTION

The present invention relates to an apparatus and methodology producing bakeable liquid egg having an extended refrigerated shelf life.

BACKGROUND OF THE INVENTION

The pasteurization of eggs calls for a neverending balancing of factors. For example, the U.S. Department of Agriculture ("U.S.D.A.") has set minimum criteria for the pasteurization of liquid whole egg and other egg products. See, U. S. Dept. of Agriculture, Egg Pasteurization Manual 74-48, February 1969. Pasteurized liquid whole egg which has been processed in accordance with these minimum standards does not pose a danger to the consumer from, for example, salmonella, and the like, poisoning and retains substantially all of its baking functionality. That is, the thus treated egg product is able to be used in the most rigorous of baking applications. However, the refrigerated shelf life of these eggs is relatively short, on the order of 7 to 14 days, and the total concentration of secondary bacteria remains high.

If higher temperature pasteurization is used, such as for example, 152° F. for the same 3.5 minutes, the refrigerated shelf-life of the resulting liquid whole egg can be dramatically increased to 4-10 weeks, or even longer. However, the resulting liquid whole egg product has lost significant baking functionality. In fact, at this temperature and time, the egg product may begin to coagulate and may thus lose its liquid quality.

Obviously, the development of a liquid egg product and, in particular, a liquid whole egg product which has both an extended refrigerated shelf life and retained baking functionality would be highly desirable. More importantly, however, the development of an economically efficient process which utilizes cost effective apparatus for the production of such an egg product has long been sought. Yet the solution to providing an egg product satisfying both of these requirements, and a cost effective manner of making these liquid eggs have eluded the industry.

Koonz et. al., U.S. Pat. No. 2,565,311 relates to a method of egg pasteurization which involves the step of shelling whole eggs, hashing or homogenizing the liquid egg, flash heating the liquid egg to a temperature of between about 138° to 150° F., and then pasteurizing the liquid egg at a temperature of between about 125° to 145° F. This is followed by the steps of chilling the liquid egg to between 40° and 55° F. and then freezing the pasteurized liquid egg. Koonz et. al. therefore represents a single step pasteurization method wherein shelled eggs are flash heated to raise their temperature followed by a pasteurization step and subsequent cooling and freezing.

Jones et. al., U.S. Pat. No. 3,113,872 relates to a method of treating shelled eggs which includes first subjecting the shelled egg to a first heating step where the egg is heated to about 143° F. by the heated metal surface of a conventional plate heat exchanger for about 30 seconds. The heated egg is next transferred to a vacuum chamber where volatile esters are removed. During this treatment, the heat is maintained at a temperature of not less than 140° F. for a period of about 3.0 minutes. The egg is then infused with steam to raise its temperature to between about 155° F. and 165° F., and preferably to about 158° F.

According to Jones et. al., it is important that the liquid egg must remain at an elevated temperature throughout the process and especially just prior to steam infusion so that the egg does not have a great chilling effect on the steam. Furthermore, it is important that the final heating step be conducted in the absence of heated metallic surfaces. According to Jones et. al. it is only by the use of a final heating step which does not include contact with a heated surface that the temperature of the egg can be elevated to a high enough temperature.

None of these methods, nor other methods of which the inventors are aware, have been capable of conveniently and efficiently producing liquid whole egg or other liquid egg products which have both extended refrigerated shelf life and retained baking functionality. The present invention allows for the realization of just such a liquid egg product in an economically feasible way.

OBJECTS AND SUMMARY OF THE INVENTION

One of the objects of the present invention is to provide methods for pasteurizing and treating liquid egg including, for example, liquid whole egg, so as to provide a product which has both retained baking functionality and extended refrigerated shelf life.

It is also an object of the present invention to provide methods for pasteurizing liquid egg which are continuous, efficient, and cost-effective.

In accordance with these objects, there is provided a method of pasteurizing liquid egg which includes the steps of heating liquid egg to a first temperature by contacting the liquid egg with a heated surface, maintaining the liquid egg at that first temperature for a first period of time sufficient to pasteurize the liquid egg, heating the liquid egg to a second temperature which is higher than the first temperature by contacting the liquid egg with a heated surface, and then maintaining the liquid egg at the second temperature for a second period of time which is less than the first period of time. More specifically, the second period of time generally ranges from between about 2 seconds to about 2 minutes and is, more preferably, a period ranging from of about 5 and about 20 seconds. The second temperature and second period of time are sufficient to provide additional microbial kill. The resulting liquid egg has both extended refrigerated shelf life and retained baking functionality.

In accordance with a more preferred embodiment of this aspect of the present invention, there is provided a method of pasteurizing liquid egg which includes the steps of adding to liquid whole egg, i.e., liquid egg containing at least some liquid egg white and liquid egg yolk, preferably in a refrigerated state, an amount of at least one consumable oxidizer effective to aid in pasteurization, then preheating the liquid egg to a temperature of between about 100° F. and about 135° F. and more preferably between about 120° F. and 130° F. The preheated liquid egg is then heated to a first temperature of between about 140° F. and 149° F. by contacting the liquid egg with a heated surface such as a conventional plate heat exchanger.

It is preferred that the heated liquid egg is then homogenized. After homogenization the liquid egg is held or maintained at the first temperature for a first period which ranges from between about 3 and about 5 minutes. At the end of this time the homogenized liquid egg is pasteurized. Of course, it is acceptable to homogenize the heated liquid egg after the liquid egg has been held for the first period.

The pasteurized liquid egg is then reheated to a second temperature of between about 150° F. and about 159° F., and more preferably between about 150° F. and about 155° F. by contacting the liquid egg with a heated surface. The reheated liquid egg is then re-held at the second temperature for a second period of time which is less than the first period of time and ranges from about 2 seconds to about 2 minutes and, more preferably, between about 5 and about 20 seconds. Finally, the pasteurized and reheated liquid whole egg is cooled to a temperature of between about 30° F. and about 45° F. and more preferably between about 30° F. and 35° F.

In another and preferred embodiment of this aspect of the present invention, the methods just described further include the step of cooling the liquid egg after pasteurization and before reheating to the second temperature. By cooling, it should be understood that the liquid egg may either be chilled by first reducing the temperature of the egg to between about 40° F. and about 100° F., and more preferably between about 50° F. and about 75° F. and then, optionally, additionally refrigerated. When further cooling is desirable, the chilled liquid egg is refrigerated to a temperature of between about 30° F. and about 45° F. If the liquid egg is to be stored for any length of time prior to subsequent treatment to accomplish additional microbial kill, the liquid egg is refrigerated to a temperature of between about 30° F. and 35° F. If, however, the egg will be additionally processed immediately or quickly, refrigeration may bring the temperature of the liquid egg to between about 35° F. and about 45° F.

More preferably, this method includes the steps of adding to liquid egg containing at least some liquid egg white and at least some liquid egg yolk, (i.e., liquid whole egg) preferably in a refrigerated state, an amount of at least one consumable oxidizer effective to aid in pasteurization and then pre-heating and about 135° F. More preferably, preheating brings the temperature of the liquid egg to between about 120° F. and about 130° F. Thereafter, the preheated liquid egg is heated to a first temperature of between about 140° F. and about 149° F. by contacting the liquid egg with a heated surface. This is generally followed by homogenization. The homogenized heated liquid egg is then held and maintained at the first temperature for a first period of time of between about 3 and about 5 minutes until pasteurization is complete. Of course homogenization can be accomplished after "holding" instead of before.

Thereafter, the liquid whole egg is cooled. Cooling may be accomplished by merely chilling the egg to a temperature of between about 40° F. and about 100° F. and more preferably between temperatures of between about 50° F. and about 75° F. or, optionally, additionally refrigerated to a temperature of between about 35° F. and about 45° F. After cooling, the pasteurized liquid egg is then re-preheated to a temperature of between about 100° F. to about 139° F. and more preferably between about whole egg is then reheated to a second temperature of between about 150° F. and about 159° F., and preferably 150° F. and 155° F. by contacting the liquid whole egg with a heated surface. The reheated liquid egg may then be, optionally, re-homogenized. In either event, the reheated liquid egg is then re-held at the second temperature for a second period of time. The second period of time ranges from between about 2 seconds and about 2 minutes and preferably ranges from between about 5 seconds and about 20 seconds. Thereafter, the liquid egg is re-cooled, preferably to a temperature of between about 30° F. and about 35° F.

It is generally known that the application of sufficient heat for sufficient time to whole egg or egg components in the liquid form will result in the loss of certain characteristics such as baking functionality. It is therefore necessary, when pasteurizing liquid egg with the intent of maintaining baking functionality, to use "gentle" conditions. This may be accomplished by minimizing the time exposure of the liquid egg and the temperature at which that exposure takes place while still assuring adequate pasteurization.

However, while such a treatment is capable of providing pasteurized liquid egg, and preferably pasteurized liquid whole egg, having baking functionality, it is not capable of producing liquid eggs having extended refrigerated shelf life. To accomplish this latter generally requires the exposure of the liquid egg to more "rigorous" conditions including higher temperatures and longer times of exposure to the higher temperature. Furthermore, according to Jones et. al., this more rigorous treatment must be conducted by some means other than contacting the egg with a heated surface.

The inventors have found, unexpectedly, that by combining the "gentler" pasteurization procedures useful for obtaining liquid egg retaining baking functionality with a relatively short exposure of a pasteurized liquid egg to higher temperatures generated by a heated surface for a short period of time, they are able to retain baking functionality and, in addition, gain extended refrigerated shelf life.

The methods of the present invention are particularly advantageous in that they may be used in conjunction with conventional pasteurization equipment with very little modification necessary. Thus, for example, liquid egg could be pre-heated and heated through the various sections of a conventional plate heat exchanger and held at pasteurization temperature for time sufficient to effectuate pasteurization, cooled, and then deposited in an intermediate refrigerated holding tank. Thereafter, the apparatus used for pasteurization could be cleaned and sterilized such that the pasteurized condition of the liquid egg is not compromised. The apparatus is then reconfigured such that it is now capable of providing an additional microbial kill. Thereafter the pasteurized liquid egg is re-introduced into the apparatus only to be returned, in cooled condition, to the intermediate holding tank. Thus the methods of the present invention can accommodate single unit processing.

Preferably, however, the methods of the present invention utilize an apparatus which will more efficiently provide for both continuous pasteurization and the continuous provision of additional microbial kill such as a dual processing unit.

Another objective of the present invention is the provision of an apparatus which may be used to carry out the previously described methods.

In accordance with these objectives, there is provided a dual processing unit apparatus for producing pasteurized liquid egg having extended refrigerated shelf-life and retained baking functionality which includes a means for pasteurizing liquid eggs adapted to heat the liquid egg to a first temperature by contacting the liquid egg with a heated surface and adapted to maintain the liquid egg at the first temperature for a first period of time sufficient to allow for pasteurization. This means for pasteurizing is in fluid communication with a means for providing additional microbial kill. The means for providing additional microbial kill is adapted to reheat the pasteurized liquid egg to a second temperature which is higher than the first temperature by contacting the liquid egg with a heated surface and is adapted to maintain the reheated pasteurized liquid egg at the second temperature for a second period of time which is less than the first period of time and which is generally between about 2 seconds and about 2 minutes and, more preferably between about 5 seconds and about 20 seconds.

This above dual unit apparatus, in a more preferred embodiment, also includes a means for cooling the pasteurized liquid egg adapted to chill and/or cool the liquid egg after pasteurization and before additional microbial kill, the means for pasteurizing liquid egg and the means for providing additional microbial kill being in fluid communication with the means for cooling.

Another object in accordance with the present invention is the provision of liquid egg product which results from the use of the previously described methods.

BRIEF DESCRIPTIONS OF THE DRAWINGS

DETAILED DESCRIPTION OF THE PREFERRED EMBODIMENTS

Figure 1:
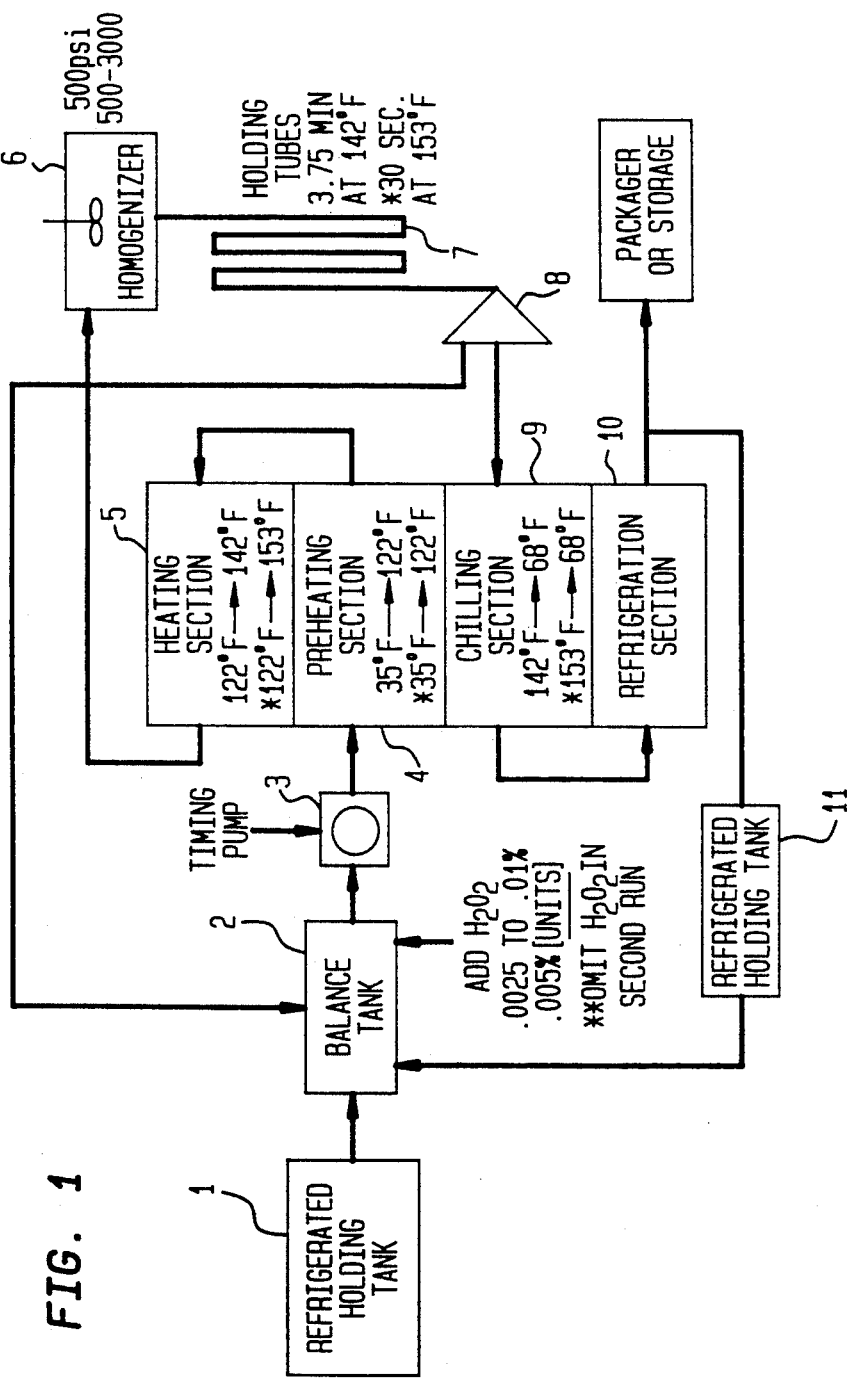
FIG. 1 is a schematic representation of a process in accordance with the present invention utilizing a single unit processor apparatus.

The term "liquid egg" in accordance with the present invention encompasses the shelled proteinous contents of, for example, a chicken egg. The term may include liquid egg white, liquid egg yolk or liquid whole egg. The term "liquid whole egg" as used herein includes not only liquid egg in the exact ratio of egg white and egg yolk found in natural occurring eggs, but also, for example, the product which results from the intermixing of a separated liquid egg white and separated egg yolk in any predetermined ratio. The terms "liquid whole egg" and "liquid egg" also include products having additional additives such as sugar, salt, stabilizers, dextrins, emulsifiers and the like. These are preferably added to the liquid egg prior to pasteurization.

Furthermore, as used herein, the terms "pasteurization", "pasteurize" and "pasteurized" refer to the killing of sufficient pathogenic microorganisms contained within liquid egg so as to render the liquid egg edible without threat of, for example, salmonella infection, for at least seven days. "Pasteurization" may also be thought of as a treatment which is designed to eliminate, for all practical purposes, pathogenic microorganisms. A secondary purpose is to reduce the spoilage microorganisms to improve the keeping quality of the egg product. At U.S.D.A. minimum time and temperature parameters, pasteurization will generally produce liquid egg which will have a shelf life of between about 7 and 14 days.

The term "additional microbial kill" encompasses the results obtained when pasteurized liquid egg which has been "gently" pasteurized in accordance with the present invention is submitted to a more "rigorous" treatment by contacting the liquid egg with a heated surface to elevate its temperature above the first temperature for a shorter duration than the time and temperature used in pasteurization. Preferably, the second period is between about 2 seconds and about 2 minutes and more preferably between about 5 and about 20 seconds. It is believed that by subjecting the pasteurized liquid egg to a subsequent treatment of the application of a second temperature for a second period of time, the damaged, weakened, or slightly resistant microbes which were not killed as a result of the "gentle" pasteurization step are killed.

The term "extended refrigerated shelf life" means that the liquid egg is safe to consume for a period of at least three weeks after treatment in accordance with the present invention. This, of course, assumes refrigerated storage. Preferably, the term "extended refrigerated shelf life" means that the liquid egg is safe to consume for a period of at least four weeks after treatment in accordance with the present invention.

The term "retained baking functionality" means that despite the application of heat in accordance with the present invention, the liquid egg is useful for most commercial and home, if not all, baking applications. Baking functionality relates primarily to the emulsification properties of the liquid egg. This function directly relates to the stability of water/oil, water/air, oil/air, or water/oil/air phases. Emulsification influences the viscosity of the batter, volume of the baked goods and stability thereof. The stability of a two or three phase system also greatly affects the texture of the resulting baked product. In a cake, a desirable soft uniform crumb can be achieved only with the proper emulsification system. In fact, the quality of certain baked goods, such as, for example, sponge cake, is considered wholly dependent upon the quality of the egg used. Good egg product, that is one having high baking functionality, yields high volume and soft texture.

In the most general sense, the present invention involves heating liquid egg as defined herein to a first temperature by contacting the liquid egg with a heated surface and maintaining the liquid egg at the first temperature for a first period of time. The resulting liquid egg is pasteurized. The pasteurized liquid egg is subsequently re-heated to a second temperature, by re-contacting the liquid egg with a heated surface, the second temperature being higher than the first temperature, and maintaining the liquid egg at the second temperature for a second period of time which is shorter than the first period of time and which ranges from between about 2 seconds to about 2 minutes and more preferably from between about 5 seconds to about 20 seconds.

In utilizing the apparatus and methods of the present invention, one may start with liquid egg which is refrigerated, frozen or at room temperature. The liquid egg may come from a tanker or other appropriate storage device or straight from an egg breaking and/or separating apparatus.

It is preferred, in accordance with the present invention, that the steps of preheating, heating, chilling and finally refrigerating the liquid egg as described herein are accomplished by the use of various sections of a conventional plate type heat exchanger. Of course, a plurality of discrete heating and cooling devices may be used instead. Furthermore, it is, of course, possible to directly heat and directly cool the liquid egg without the use of preheating and/or chilling steps.

The use of other equipment such as flow diversion valves, timing pumps, holding and balance chambers, homogenizers, thermometers, recording devices, automated controllers and oxidizer injection pumps and flowmeters are all possible.

The invention may be better understood with reference to the figures. For the purposes of these explanations, liquid egg refers to liquid whole egg having a ratio of liquid egg white and liquid egg yolk which closely approximates the ratio of egg white and egg yolk found in a normal egg. Unless indicated otherwise, times and temperatures will be related to the processing of such a liquid whole egg product.

With reference to FIG. 1, the process of the present invention may be carried out by the use of a conventional pasteurization device (i.e. single unit processing apparatus) with only slight modification. For example, liquid egg, may be stored in, for example, a refrigerated holding tank Thereafter it is transferred to a balance tank 2. The balance tank 2 helps to insure that a constant level of liquid egg is provided to the pasteurizer and helps prevent air from entering the pasteurizer. The balance tank 2 is generally open to atmospheric pressure to relieve pressure on the system and provide a visual assurance of the presence of the product. The liquid egg is then manipulated by a timing pump 3 which moves the egg at a uniform speed throughout the pasteurization equipment. In accordance with a preferred aspect of the present invention, the liquid egg then enters the preheating section 4 of a 3, or optionally 4 section heat exchanging unit. In the preheating section 4, the liquid egg is raised from its initial temperature, to a temperature of between about 100° and 135° F. and more preferably between about 120° and 130° F. After preheating in preheating section 4, the liquid egg is transported to the heating section 5 of the aforementioned multi section heat exchanger. In heating section 5 the temperature of the liquid egg is raised to a temperature which is sufficient when applied for sufficient time, to pasteurize the liquid egg. This is the first temperature. Preferably the first temperature ranges from between about 140° F. to about 149° F. After exiting the heating section, the heated liquid egg, now at the first temperature, is transported to a homogenizer 6 which uses pressure to homogenize the egg. Of course, any homogenization apparatus will suffice. However, when using a pressure based homogenizer it is preferred that the pressure used range from about 500 to about 3000 psi and preferably about 500 psi. After homogenization the homogenized liquid egg which is at the first temperature is transported to a series of holding tubes 7 where the liquid egg is maintained at the first temperature for a first period of time or "holding time" which may be any length of time so long as it is sufficient to effectuate pasteurization at the first temperature. This period of time known as the "first period" is generally between about 3 and about 5 minutes for first temperatures ranging from about 140° to about 149° F.

The length of the first period may be adjusted by, among other means, adjusting the flow rate of the liquid egg through holding tube 7 or by adjusting the length of the holding tube 7. Of course, alternate methods may be used. When exiting the holding tube 7, the liquid egg is pasteurized. The now pasteurized liquid egg next passes through a flow diversion valve 8. If the exit temperature of the pasteurized liquid egg is below the preset first temperature, the liquid egg is diverted back to the balance tank 2 so it may be reprocessed and pasteurization may be completed.

If, however, the exit temperature of the liquid egg is at or above the first temperature, the liquid egg proceeds through the remainder of the process. In the present case, where a single unit pasteurization apparatus is used, the liquid egg is cooled by passing it through a chilling section 9 of the aforementioned multi-sectioned heat exchanger whereupon its temperature is lowered from the pasteurization temperature or first temperature to between about 40° to 100° F. and more preferably between about 50° and about 75° F. Optionally, cooling may be furthered by transporting the chilled liquid egg through a refrigeration section 10 of the aforementioned multi-sectioned heat exchanger wherein its temperature may be lowered to between about 30 and about 45° F. If the egg is going to be stored for any length of time, it is preferred that the egg be cooled to a temperature of between 30° and about 35° F. If, however, the liquid egg be stored for an appreciable period of time, it may only be necessary to cool to a temperature of between 30° and 40° F. After cooling, the pasteurized liquid egg is transferred to a second holding tank 11 where the egg is maintained under conditions which will protect the integrity of pasteurization. It is also possible to eliminate cooling entirely wherein the liquid egg exiting holding tubes 7 is transported directly to tank 11. In either event, the pasteurization unit including units 2 through 10 are then cleaned by use of Clean-In-Place (C.I.P.)/Clean-Out-of-Place (C.O.P.) procedures known in the art.

The heating temperature of the apparatus is that adjusted by adjusting one or both of the temperatures of the preheating section 4 and/or heating section 5 and the holding time is adjusted by, for example, adjusting the length of the holding tube 7 such that the device is now capable of treating pasteurized liquid egg to provide additional microbial kill. Thereafter, the pasteurized liquid egg is reintroduced into the apparatus under clean conditions to insure no recontamination which would compromise the pasteurized condition of the liquid egg. Preferably, the pasteurized liquid egg is reintroduced into the balance tank 2 of the aforementioned apparatus. Thereafter, the pasteurized liquid egg is pumped, using timing pump 3, to the pre-heating section 4 where it is re-preheated to a temperature of between about 100° and about 139° F. and preferably between about 100° and 135° F. The repreheated liquid egg is then transported to the heating section 5 of the aforementioned heat exchanger where it is reheated to a temperature of between about 150° and about 159° F. and more preferably between about 150° and 155° F. It is not necessary that the reheated liquid egg exiting heating section 5 be rehomogenized in homogenizer 6. However, it may optionally be rehomogenized therein. The liquid egg is then transported to holding tubes 7 where it is maintained at the reheated temperature or "second temperature" for a second period of time ranging from between about 2 seconds and about 2 minutes and more preferably between about 5 and 20 seconds. Thereafter the re-heated and re-held liquid egg is re-cooled by re-chilling in chilling section 9 and, preferably, further refrigeration cooling section 10. The liquid egg can then be stored for subsequent use or immediately used as desired.

It is, of course, unnecessary that the egg be re-cooled. In fact, in some direct process applications, it may be preferable that the egg be merely chilled or be directly introduced, in its heated condition, to, for example, a cake batter mixing chamber.

The egg product that results from the above-described process is not only pasteurized, (accomplished by the exposure of the liquid egg to the first temperature for the first period) but also treated to provide additional microbial kill, (exposure to the second temperature for the second period). Because of the relatively minimal time and temperature used to effectuate pasteurization and the relatively short exposure of the liquid egg to the higher temperature generated during reheating to the second temperature, the present inventors have been able to obtain a pasteurized liquid egg product which has both retained baking functionality and extended refrigerated shelf life.

Figure 2:
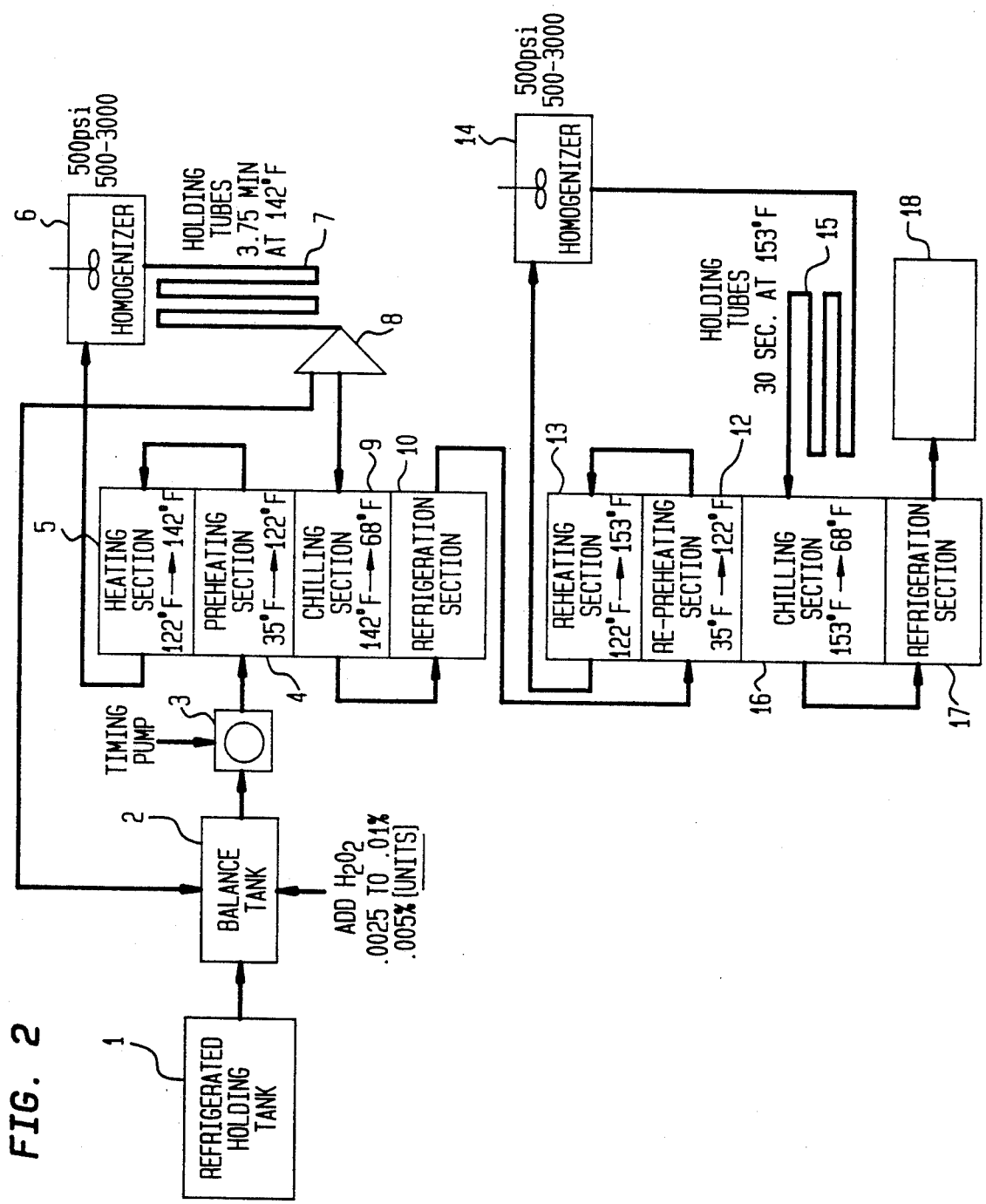
FIG. 2 is a schematic representation of a preferred process in accordance with the present invention using a two dual unit apparatus including an intervening cooling step.

The most efficient way to accomplish the processes of the present invention, however, is the use of a plurality of treatment units directly interconnected such that no intermittent holding and cleaning steps are necessary.(i.e. a dual unit process apparatus) This aspect of the present invention may be better understood with reference to FIG. 2. In a preferred embodiment of the apparatus of the present invention and with regard to FIG. 2, liquid egg may be stored in a refrigerated holding tank 1 and held at a temperature between about 30° and 45° F. Preferably the holding tank maintains the liquid egg at a temperature of between about 30° and 35° F. Holding tank 1 (as previously described) may further include means for agitating the liquid egg contained therein (not shown) such as, for example, a lightening mixer. The means for agitating helps prevent the separation of egg white and egg yolk when liquid whole egg is treated and helps prevent settling in general. From holding tank 1 the liquid egg is transferred to a balance tank 2 as previously described. While, of course, pasteurization may be accomplished in a single heating step or by the use of a plurality of discrete heating apparatus, it is preferred that both heating and cooling of the liquid egg be effectuated in various sections of a multi-section heat exchanger. The liquid egg is pumped through a timing pump 3 from balance tank 2 into the pre-heating section 4 of a 3, and optionally 4 section exchanger as previously described. The timing pump 3 insures the proper flow rate of the liquid egg throughout the various heating, holding, and cooling stages to follow. In the pre-heating section 4 the temperature of the liquid egg is raised to a temperature of between about 100° and about 135° F. and more preferably, between about 120° and 130° F. The pre-heated liquid egg then is transported from pre-heating section 4 to the heating section 5 of the aforementioned heat exchanger. In heating section 5, the pre-heated liquid egg is elevated to the temperature of between about 140° to about 149° F. known as the "first temperature". This temperature, when applied for a sufficient time, is sufficient to pasteurize the liquid egg product, yet, "gentle" enough to effectuate pasteurization without ruining the baking functionality of the liquid egg product.

The liquid egg then exits heating section 5 and is transported to a homogenizer 6 which uses pressure to homogenize the egg. The homogenizer 6 is as previously described. After homogenization the liquid egg is transported to a series of holding tubes 7 where the liquid egg is maintained at the first temperature for the "first period" of time or "holding time". The holding time or first period is any length of time so long as it is sufficient to effectuate pasteurization at the first temperature. The period known as the "first period" is generally between about 3 minutes and about 5 minutes at temperatures between about 140° F. and 149° F.

In the context of this apparatus, and indeed, any of the other apparatuses described herein, it is, of course, possible to arrange the apparatus such that homogenization is conducted after the completion of holding such that after exiting the heating section 5 of the multi-section heat exchanger, the heated liquid egg is transported directly to holding tube 7 and thereafter to homogenizer 6.

When exiting holding tube 7, the liquid egg is pasteurized. The pasteurized liquid egg next passes through a flow diversion valve 8. The diversion valve 8 serves the same function as previously described allowing the egg to either be further treated or returned to balance tank 2.

In accordance with this aspect of the present invention, the pasteurized liquid egg is next cooled or, at very least, chilled. Specifically, the liquid egg is chilled in a chilling section 9 of the aforementioned multi-section heat exchanger to a temperature of between about 40° and about 100° F. and, more preferably, a temperature of between about 50° and 75° F. Thereafter, the liquid egg may be, optionally, further cooled in a refrigeration section 10 of the multi-plate heat exchanger to a temperature of between about 30° and about 45° F. Using a dual unit apparatus as described herein, it is preferred that the thus cooled liquid egg be cooled to a temperature of between about 35° and 40° F.

The now chilled and optionally refrigerated pasteurized liquid egg is preferably transferred directly to a re-preheating section 12 of a second multi section heat exchanger where the homogenized liquid egg is pre-heated to a temperature of between about 100° and 139° F. and more preferably between about 120° and about 135° F. Thereafter the pasteurized liquid egg is transferred to a reheating section 13 of the second multi section heat exchanger where the pasteurized liquid egg is raised to the "second temperature" The second temperature is a temperature which, when applied for the appropriate amount of time is effective to provide additional microbial kill, and yet insufficient to destroy the baking functionality of the pasteurized liquid egg. The second temperature or reheating temperature is preferably between about 150° F. and 159° F. and, more preferably between about 150° F. and 155° F.

After reheating, the pasteurized and reheated liquid egg may be optionally rehomogenized in a homogenizer 14 having the same construction as homogenizer 6 previously described. The egg is then transported to holding tubes 15 where it is held for a period known as the "second period" which ranges from between about 2 seconds to about 2 minutes and is preferably between about 5 seconds and about 20 seconds. Upon exiting holding tube 15 the reheated pasteurized liquid egg possesses not only baking functionality, but also exhibits extended refrigerated shelf life. The liquid egg may be used immediately at the second temperature or may be cooled by chilling and optionally refrigerated, preferably by using a chilling section 16 and optional refrigeration section 17 of the second multi-section heat exchanger. These sections and the temperatures to which they cool the egg are identical to the temperatures disclosed in regard to chilling section 9 and cooling section 10. If the egg is not immediately used thereafter, it may be deposited in a refrigerated holding tank 18.

Figure 3:
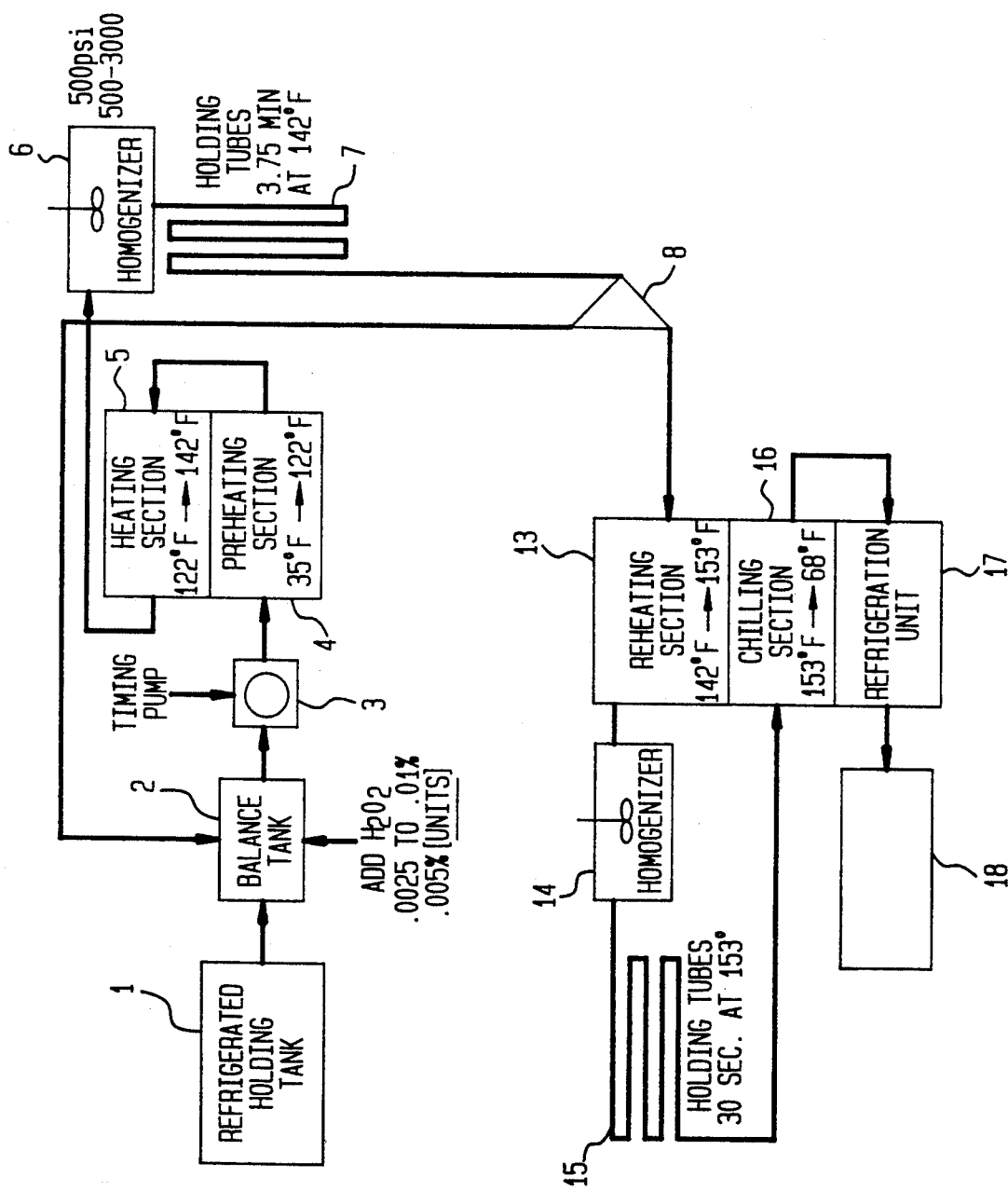
FIG. 3 is a schematic representation of another preferred process in accordance with the present invention utilizing a dual unit apparatus without an intervening cooling step.

With reference to FIG. 3, the process just described may be modified by eliminating the use of the chilling section 9 and refrigeration section 10 of the first multi-section heat exchanger and the preheating section 12 of the second multi-section heat exchanger. Thus, the pasteurized liquid egg which exits flow diversion valve 8 and which has been maintained in the holding tube 7 at the first temperature for the first period is directly conducted to a second heating or reheating section 13 where it is reheated by elevating its temperature from the first temperature directly to the second temperature. The second temperature is generally between about 150° and 159° F. and, more preferably between about 150° and 155° F. Thereafter the liquid egg is transported to a second set of holding tubes 15 where the pasteurized liquid egg is maintained at the second temperature for a second period of between about 2 seconds and about 2 minutes and, preferably between 5 seconds and about 20 seconds. It is, of course, possible to either before or after holding, rehomogenize the liquid egg at the second temperature by transporting it through homogenizer 14. The reheated pasteurized liquid egg is then chilled and, optionally refrigerated, preferably using the chilling section 16 and refrigeration section 17 of the second multi-section heat exchanger of which heating section 13 is a part. Finally, the egg may be used or stored in, for example, a refrigerated holding tank 18.

Irrespective of the apparatus or method used, including but not limited to those embodied in FIGS. 1 through 3, it may be advantageous to add a consumable oxidizer such as an ingestible peroxide to aid in pasteurization. The peroxide may be added at various points along the process. However, it is preferred, in accordance with the present invention to add the consumable oxidizer into the balance tank 2 prior to subjecting the liquid egg to the first temperature. The peroxide oxidizes organic compounds and preferably bacteria. The oxidizer is generally consumed during the redox reaction that occurs during the process of the present invention. However excess oxidizer may be removed by the use of an enzyme such as a catalase or peroxidase which may be added before, during or after addition of the oxidizer.

It is preferred that between about 0.0025 and about 0.01 percent by weight of the liquid egg, and more preferably about 0.005 percent by weight of the liquid egg of the oxidizer be added.

In a particularly preferred embodiment of the present invention, the first period and first temperature are sufficient to at least meet U.S. Department of Agriculture ("U.S.D.A.") requirements for the pasteurization of liquid egg. These minimum U.S.D.A. requirements are recited in Table I.

TABLE I

| Liquid Egg Product | Minimum temp. reqts | | Minimum Holding Time | |
|---|---|---|---|---|
| | (°C.) | (°F.) | Fastest particle (min) | Average particle (min) |
| Albumen (without use of chemicals) | 57 | 134 | 1.75 | 3.5 |
| | 56 | 132 | 3.1 | 6.2 |
| Whole egg | 60 | 140 | 1.75 | 3.5 |
| Whole egg blends (less than 2% added nonegg ingredients) | 61 | 142 | 1.75 | 3.5 |
| | 60 | 140 | 3.1 | 6.2 |

TABLE I-continued

| Liquid Egg Product | Minimum temp. reqts | | Minimum Holding Time | |
|---|---|---|---|---|
| | (°C.) | (°F.) | Fastest particle (min) | Average particle (min) |
| Fortified whole egg and blends (24 to 38% egg solids, 2 to 12% added nonegg ingredients) | 62 | 144 | 1.75 | 3.5 |
| | 61 | 142 | 3.1 | 6.2 |
| Salt whole egg (with 2% or more salt added) | 63 | 146 | 1.75 | 3.5 |
| | 62 | 144 | 3.1 | 6.2 |
| Sugar whole egg (2 to 12% sugar added) | 61 | 142 | 1.75 | 3.5 |
| | 60 | 140 | 3.1 | 6.2 |
| Plain yolk | 61 | 142 | 1.75 | 3.5 |
| | 60 | 140 | 3.1 | 6.2 |
| Sugar yolk (2% or more sugar added) | 63 | 146 | 1.75 | 3.5 |
| | 62 | 144 | 3.1 | 6.2 |
| Salt yolk (2 to 12% salt added) | 63 | 146 | 1.75 | 3.5 |
| | 62 | 144 | 3.1 | 6.2 |

If the standards change, then those changed standards represent a preferred embodiment as just described unless they call for a first period and/or temperature which results in the destruction of baking functionality.

The apparatus in accordance with the present invention may also be represented as including a means for pasteurizing liquid egg which is adapted to heat the liquid egg to a first temperature as previously defined and maintain the liquid egg at that first temperature for a time sufficient to allow pasteurization. In one embodiment, the means for pasteurizing encompasses the preheating section 4 and heating section 5 of a heated surface heat exchanger, as well as the homogenizer 6 and the holding tubes 7 previously described. However, it may be possible that other devices and/or other arrangements could be used. For example, it may be possible to employ a single heating device which elevates the temperature of the liquid egg from its refrigerated temperature directly to, for example, 142° F. Additionally, the means for pasteurizing liquid eggs need not encompass a homogenizer.

The means for pasteurizing the liquid egg is in fluid communication with a means for providing additional microbial kill. The means for providing additional microbial kill is adapted to heat the pasteurized liquid egg to a second temperature which is higher than the first temperature and maintain the pasteurized liquid egg at the second temperature for a second period of time which is less than the first period and usually between about 2 seconds and 2 minutes.

The means for providing additional microbial kill in accordance with the present invention may also encompass a number of heated surface based devices. In accordance with a preferred aspect of the present invention, this means may include the re-preheating section 12, reheating section 13, and holding tubes 15. Of course, the heating from the refrigerated temperature of about 35° F. to, for example, 153° F. may be accomplished by a single heating device rather than a combination of a preheating section and a heating section of a single heat exchanger.

The apparatus may also include a means for cooling the pasteurized liquid egg adapted to chill and optionally refrigerate the liquid egg after pasteurization and before additional microbial kill. The means for pasteurizing liquid egg and the means for providing additional microbial kill are in fluid communication with the means for cooling. This liquid egg first passes through the means for pasteurizing, then the means for cooling, and finally through the means for providing additional microbial kill.

The means for cooling defined thereby may include, for example, a chilling section 9 and a refrigeration section 10 as previously described. The means for cooling is therefore maintained in fluid communication with the means for providing additional microbial kill.

The foregoing will be better understood with reference to the following examples. These examples are for the purpose of illustration. They are not to be considered limiting as to the scope and nature of the present invention.

EXAMPLE I

Using a single unit processor, 2000 gallons of liquid whole egg having a ratio of liquid egg white and liquid egg yolk substantially identical to that found in normal chicken eggs was pumped from a refrigerated holding tank where it was stored at 35° through a balance tank and into the pre-heating section of a heat exchanger. The liquid egg was pumped at a rate of 192 lbs. per minute. A 10% solution of hydrogen peroxide was introduced into the balance tank in an amount of 0.005% by weight based on the egg being processed. The liquid egg was preheated to a temperature of 122° F. and then, after transfer to the heating section of the aforementioned heat exchanger elevated to a temperature of approximately 142° F. Thereafter the liquid egg was homogenized at 500 psi and held at the first temperature of 142° F. for a first period of 3.75 minutes. The liquid egg was then cooled by first chilling to a temperature of approximately 68° F. in the chilling section of the aforementioned heat exchanger and then refrigerated to a temperature of about 35° F. After cooling was accomplished the egg was transferred to a refrigerated holding tank for storage. When all of the egg had been processed, the apparatus was cleaned and reconfigured such that the liquid egg would be heated to a temperature of about 153° F. and held for a second period was removed from the intermediate refrigerated holding tank and re-introduced into the balance tank under conditions which would maintain the pasteurized condition of the liquid egg. The liquid egg was then pumped at the previously described rate through a preheating section of the previously described heat exchanger wherein its temperature was raised from about 35° F. to about 122.20 F. The re-preheated liquid egg was then transferred to a heating section where its temperature was elevated to a temperature of about 153° F. This is the second temperature. Thereafter, the reheated liquid egg was transferred directly to holding tubes which had been shortened such that the liquid egg was held at the second temperature for a second period of 30 seconds. Finally, the liquid egg was cooled by chilling and refrigerating and returned to the intermediate holding tank.

EXAMPLE II

Liquid whole egg was treated in accordance with Example I with the exception of the omission of hydrogen peroxide.

EXAMPLE III

Liquid whole eggs were treated in a conventional single step pasteurization process whereby the liquid whole egg was heated at 153° F. for 3.5 minutes and subsequently cooled.

EXAMPLE IV

The liquid whole egg prepared in accordance with Examples I, II and III were incorporated into pound cake batter and sponge cake batter and six cakes of each was prepared. The identical ingredients, cooking times, cooking temperatures, size and other relevant parameters were maintained for each cake.

Both the pound cakes and the sponge cakes made from the liquid whole egg treated in accordance with Examples I and II exhibited a light and tender texture with a typical crumb structure and good quality.

Both the sponge and the pound cakes made with the liquid whole egg prepared in Example III were not fully developed, had less volume and had an inferior crumb structure and texture when compare to the pound and sponge cakes prepared with the liquid whole eggs of the present invention.

Volume was measured by a seed displacement test. In accordance with this procedure, a fixed amount of fine seeds such as grape seed or sesame seed are placed into a loaf pan until full and weighed. The pan is then emptied. Thereafter a fixed amount of batter is introduced to the loaf pan and a cake is baked. Once the cake is fully baked, seeds are added to the pan. Obviously, less seeds may be introduced into the pan because of the displaced volume of the cake. The amount of seeds which may be added are then weighed and the weight compared to the initial weight. A proportional relationship exists between the weight of seeds before and after the introduction of the cake, and a cakes volume. Specifically, the less the resulting weight, the greater the volume.

Because of the superior qualities of the cakes baked with liquid whole egg in accordance with the present invention, namely higher volume, better crumb structure and texture and better over-all appearance, it is clear that liquid whole egg prepared in accordance with the present invention retains baking functionality, i.e. retains substantial emulsification properties. In contrast, liquid whole egg treated at 153° for 3.5 minutes such that it would have extended refrigerated shelf life yield inferior cakes indicating a significant decrease in baking functionality.

EXAMPLE V

Liquid whole egg prepared in accordance with Example I was packaged in a gable top clean pack using a Cherry-Burrell EQ3 packager and stored under refrigerated conditions of 35°-38° F. and the contents of the package were tested at various intervals. The liquid whole eggs treated in accordance with the procedure in Example I were found to have a refrigerated shelf life in excess of 13 weeks. Eggs treated at 142° F. for 3.5 minutes with no subsequent treatment and packaged in a like manner can be expected to have a refrigerated shelf life of between about 2 and 3 weeks or less.

The principles, preferred embodiments and modes of operation of the present invention have been described in the foregoing specification. The invention which is intended to be protected herein, however, is not to be construed as limited to the particular embodiment disclosed since these are to be regarded as illustrative rather than restrictive. Variations and changes may be made by others without departing from the spirit and scope of this invention.

I claim:

1. A method of pasteurizing liquid egg comprising the steps of heating liquid egg to a first temperature by contacting said liquid egg with a heated surface, and maintaining said liquid egg at said first temperature for a first period sufficient to pasteurize said liquid egg; and then heating said liquid egg to a second temperature which is higher than said first temperature by contacting said liquid egg with a heated surface, and maintaining said liquid egg at said second temperature for a second period which is less than said first period and which second period and second temperature are sufficient to cause additional microbial kill, to provide an extended refrigerated shelf life while retaining baking functionality, said second period being from about 2 seconds to about 2 minutes.

2. The method of claim 1 further comprising the step of cooling said liquid egg after pasteurization and before heating said liquid egg to said second temperature.

3. The method of claim 2 wherein said first temperature and said first period are effective to at least meet U.S.D.A. minimum standards for pasteurization of said liquid egg.

4. The method of claim 3 wherein said liquid egg is liquid whole egg.

5. The method of claim 4 wherein said first temperature ranges from about 140° F. to about 149° F. and said first period ranges from about 3.0 to about 5.0 minutes.

6. The method of claim 5 wherein said first temperature is about 142° F. and said period is about 3.75 minutes.

7. The method of claim 3 further comprising the step of adding an amount of at least one ingestible peroxide effective to aid pasteurization, prior to heating said liquid egg to said first temperature.

8. The method of claim 7, wherein said ingestible peroxide is provided in an amount of between about 0.0025 to about 0.01% by weight of said liquid egg.

9. The method of claim 8 wherein said ingestible peroxide is provided in an amount of about 0.005% by weight of said liquid egg.

10. The method of claim 9 wherein said ingestible peroxide is hydrogen peroxide.

11. The method of claim 2 wherein said cooling step lowers the temperature of said liquid egg such that it ranges from about 30° F. to about 45° F.

12. The method of claim 1 wherein said method temperature ranges from about 150° F. to about 159° F. and said second period ranges from about 5 seconds to about 45 seconds.

13. The method of claim 12 wherein said second temperature ranges from about 150° F. to about 155° F. and said second period ranges from about 5 to about 20 seconds.

14. A method of pasteurizing liquid whole egg comprising the steps of:
adding to refrigerated liquid whole egg an amount of hydrogen peroxide effective to aid in pasteurization;
preheating said liquid whole egg to a temperature of between about 100° F. and about 135° F.;
heating said liquid egg to a first temperature of between about 140° F. and bout 149.20 F. by contacting said liquid egg with a heated surface;
homogenizing said heated liquid whole egg;
holding said heated liquid whole egg at said first temperature for a first period of between about 3 minutes and about 5 minutes;
cooling said liquid whole egg to a temperature of between about 30° F. and about 45° F.;
re-preheating said liquid whole egg to a temperature of between about 100° F. and about 139° F.;
reheating said liquid whole egg to a second temperature of between about 150° F. and about 159° F. by contacting said liquid whole egg with a heated surface;
re-homogenizing said reheated liquid whole egg;
re-holding said liquid whole egg at a said temperature for a second period of between about 2 seconds and about 2 minutes; and
re-cooling said liquid whole egg to a temperature of between about 30° F. and about 45° F.

15. The method of claim 14 wherein said hydrogen peroxide is added in an amount of about 0.0005% by weight of said liquid whole egg, said preheating temperature is between about 120° F. and about 130° F. said re-preheating temperature is between about 120° F. and about 135° F. said second temperature is between about 150° F. and about 15520 F. and said second period is between about 5 seconds and about 20 seconds.

16. The method of claim 15 wherein said hydrogen peroxide is added in am amount of about 0.005% by weight of said liquid whole egg, said preheating temperature is between about 120° F. and about 130° F., said second temperature is between about 150° F. and about 155° F. and said second time is between about 5 and about 20 seconds.

17. A method of pasteurizing liquid whole egg comprising the steps of:
adding to refrigerated liquid whole egg an mount of hydrogen peroxide effective to aid in pasteurization;
preheating said liquid whole egg to a temperature of between about 100° F. and about 135° F.; heating said liquid whole egg to a first temperature of between about 140° F. and about 149° F. by contacting said liquid egg with a heated surface;
homogenizing said heated liquid whole egg;
holding said heated liquid whole egg at said first temperature for a first period of between about 3 minutes and about 5 minutes;
reheating said liquid whole egg to a second temperature of between about 150° F. and about 159° F. by contacting said liquid egg with a heated surface;
re-holding said liquid whole egg at a said temperature for a second period of between about 2 seconds and about 2 minutes; and
cooling said liquid whole egg to a temperature of between about 30° F. and about 45° F.

* * * * *

UNITED STATES PATENT AND TRADEMARK OFFICE
CERTIFICATE OF CORRECTION

PATENT NO. : 5,167,976

DATED : December 1, 1992

INVENTOR(S) : Papetti

It is certified that error appears in the above-identified patent and that said Letters Patent is hereby corrected as shown below:

```
Column 1, line 17, after "Manual", insert --ARS--.
Column 3, line 43, after "pre-heating", insert --the liquid
    egg to a temperature of between about 100°F--.
Column 3, line 64, after "about", insert --120°F and 135°F.
    The re-preheated pasteurized liquid--.
Column 7, line 24, after "tank", insert --1.--.
Column 9, line 49, ".3" should read --3--.
Column 13, line 41, after "period", insert --of 30 seconds.
    Thereafter the pasteurized liquid egg--.
Column 13, line 49, "122.20 F" should read --122°F--.
Column 15, line 45, "method" should read --second--.
Column 16, line 2, "149.20 F" should read --149°F--.
Column 16, line 28, "15520 F" should read --155°F--.
Column 16, line 31, "am" should read --an--.
Column 16, line 39, "mount" should read --amount--.
```

Signed and Sealed this

Twenty-first Day of December, 1993

Attest:

BRUCE LEHMAN

*Attesting Officer*     Commissioner of Patents and Trademarks